July 12, 1932.  R. SARAZIN  1,866,675

AUTOMATIC MACHINE FOR ARC WELDING

Filed June 6, 1927  2 Sheets-Sheet 1

R. Sarazin
INVENTOR

By Marks & Clerk
Attys.

July 12, 1932.  R. SARAZIN  1,866,675
AUTOMATIC MACHINE FOR ARC WELDING
Filed June 6, 1927   2 Sheets-Sheet 2

R. Sarazin
INVENTOR

By: Marks & Clerk
Attys.

Patented July 12, 1932

1,866,675

UNITED STATES PATENT OFFICE

ROBERT SARAZIN, OF NEUILLY-SUR-SEINE, FRANCE

AUTOMATIC MACHINE FOR ARC WELDING

Application filed June 6, 1927, Serial No. 196,880, and in France July 12, 1926.

It is well known that the proper working of an automatic machine for arc welding depends essentially on the regularity of feed or advance of the wire constituting the electrode, as well as on the facilities of starting or striking of the arc.

The automatic machine for arc welding forming the subject-matter of the invention is characterized in that it allows a great rapidity of re-starting or re-striking and a perfect regularity of the length of the arc, during welding.

The normal welding, for a normal arc, in an automatic machine, corresponds to a tension, at the terminals, of about 18 volts, that is to say from 2 millimeters to 2,5 millimeters of arc length.

The factors which act upon the length of the welding arc are very variable and, even by taking only into account the irregularities of the part to be welded, it is obvious that the wire must be fed at a variable speed, for the purpose of compensating these irregularities and to maintain an arc length as constant as possible.

It is to be reminded that, actually, devices exist which act, for that purpose, on the speed of the motor driving the electrode-wire.

The self-regulating device of the automatic machine for arc welding, in accordance with this invention, is, on the contrary, characterized by the fact that the speed of the driving system remains constant and that the electrode-wire is fed at an average speed slightly greater than the average feed speed really necessary for feeding the arc. A regulating device is provided which, when the welding arc tends to shorten in an excessive manner, and when the electrode risks touching the part to be welded, determines stoppages in the feed of the electrode, slower speeds of feed and even reversing movements. The frequency or the duration of these stoppages, slower speeds of feed and reversing movements is function of the greater or less consumption of electrode-wire for a determined adjustment of the machine and, also, function of the regularity of the welding line.

The assemblages and self-regulating devices forming the subject-matter of this invention are illustrated in Figs. 1 to 3 of the accompanying drawings.

Figure 1:
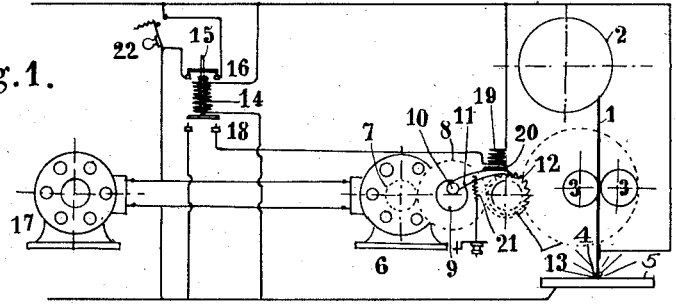
Fig. 1 shows a first form of construction in which the regulation is obtained by intermittent suppressions of the feed or advance of the wire.
Figure 2:
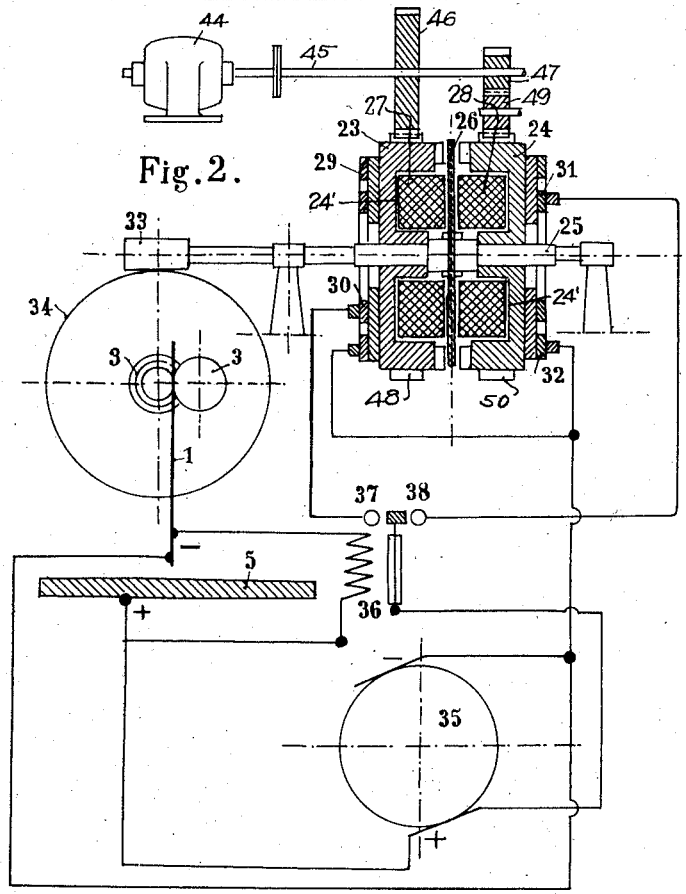
Fig. 2 shows a modification in which the regulation is effected by a combination of interruptions and reversals.
Figure 4:
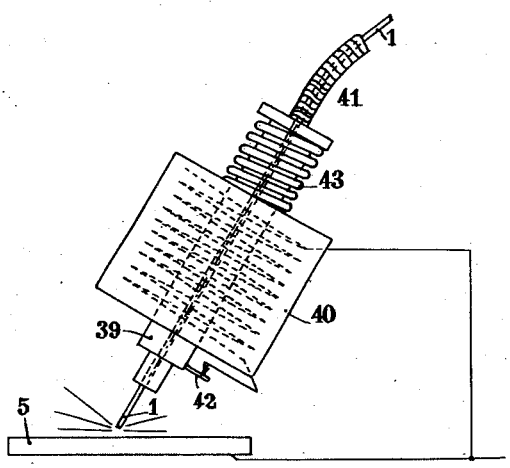

Finally, Fig. 4 illustrates a device for starting or striking the arc, which device can be combined with one of the systems of Figs. 1 and 2.

Figure 5:
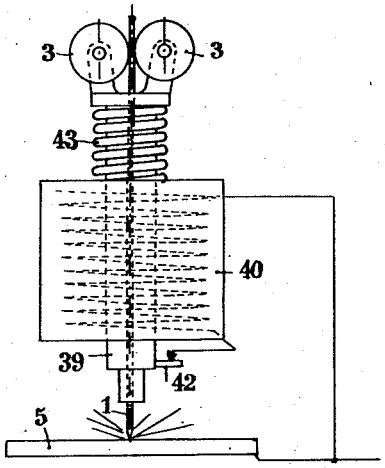

Fig. 5 corresponds to Fig. 4, except that it shows a modification in the method of driving along the wire.

Referring to Fig. 1, the electrode-wire 1 is placed on a drum 2 and is pulled by two rollers 3—3 toward the point 4 of utilization of the welding arc for the work to be effected on the member 5. For that purpose, the motor 6 is provided with a pinion 7 gearing with a toothed wheel 8. On the side of the toothed wheel is arranged a disc 9 carrying a crank pin 10 serving as a joint for a thrust link or pawl 11. On each revolution of the crank pin, the nose of the link 11 in engagement with the ratchet wheel 12 causes its advance to the extent of one tooth. The ratchet wheel 12 comes in engagement with one of the driving rollers 3 through the medium of a speed reducing gear diagrammatically illustrated at 13—13.

It will be seen that, the speed of the motor 6 being adjusted, the wire will be advanced by small successive displacements, so much the more rapid as the motor will rotate more rapidly.

In combination with this feed device is provided a system of relays, controlled by the tension at the terminals of the arc and acting for stopping the mechanism at predetermined moments and during very short periods. Thus, the excess of the average feed speed of the wire relatively to the average speed really necessary for feeding the arc is compensated.

For establishing this system of relays, it is considered that the no-load voltage at the terminals of the welding circuit is of 40 to 50 volts, whilst it is only of 18 to 25 volts in working conditions. Besides, it is known that the voltage at the terminals of the arc is proportional to the length of the latter and that it can be estimated that the value of this voltage is of 25 volts for an arc of 5 millimeters and of 18 volts for an arc of 3 millimeters.

In Fig. 1, the relay 14 is a double acting relay; under a voltage of 40 to 50 volts, its plunger 15 is lifted and releases at this moment the contact 16, by opening the circuit of the motor 6, controlling the feed of the wire, and of the motor 17 ensuring the relative longitudinal displacement of the electrode-wire relatively to the part 5 to be welded. This position of the plunger 15 corresponds to the running light of the machine.

When effecting the welding operation, the voltage at the terminals of the relay being then only of 18 to 25 volts, the plunger is returned towards the lower part of the relay and, as soon as the voltage falls below a predetermined value, for instance 20 volts, this plunger closes the contact 18 which sends current through an electromagnet 19. The latter is then energized and attracts a vane 20 carried by the link or pawl 11, which releases from the teeth of the ratchet 12, this causing the instantaneous stopping of the advance or feed of the wire.

The arc then lengthens and, the voltage rising, the plunger 15 rises and opens the circuit of the electromagnet 19. The pawl 11 being urged by a returning spring 21, the latching is re-established, this determining a further intermittent advance or feed of the electrode-wire.

In case of a mistimed stoppage of the arc, a push-button 22, or a timed relay, is provided, capable of determining a new closing of the circuit of the motor 6 and, consequently, a new starting or striking of the arc.

The arrangement of Fig. 2 presents as the preceding one a great simplicity of operation and regulation. It completes the latter so as to permit the advance and backward movement of the electrode. It is known that the backward movement is necessary, at the time of starting or striking the arc for determining a gap, as soon as the electrode has touched the part to be welded.

In this arrangement, two magnetizable plates 23 and 24 are smoothly mounted on a shaft 25 and freely rotate on this shaft which is rigid with a soft steel disc 26 which can receive a very short longitudinal movement, whilst driving the shaft 25 by means of flutes. Each of the magnetizable plates 23—24 carries a coil, 27 and 28 respectively, which receives the current from an auxiliary source owing to sliding contacts constituted by insulated metallic rings, 29—30 and 31—32, respectively, with corresponding brushes. The opposed faces of the plates 23 and 24 have annular grooves 24' therein and in which the coils 27 and 28 are seated.

Accordingly as one or the other of the plates 23—24 is magnetizable, the disc 26 is attracted in one direction or the other and accompanies the rotary movement of the corresponding magnetizable plate. Both plates rotate in reverse direction and are driven, by a motor 44, the shaft 45 thereof having fixed thereon pinions 46 and 47, the former meshing with the peripheral teeth 48 of the plate 23. The pinion 47 meshes with the teeth of the pinion 49 which in turn meshes with the peripheral teeth 50 of the plate 24. Obviously through the medium of these pinions, the plates 23 and 24 will be rotated in reverse directions and at different speeds so that the withdrawal of the electrode 1 is effected more rapidly than its advance towards the piece to be welded.

The disc can therefore, rotate at will in one direction or the other and it drives, through any reduction gear, a speed reducing mechanism. In Fig. 2, this mechanism is constituted by worm 33 gearing with a worm wheel 34 the shaft of which is rigid with one of the driving rollers 3—3 of the electrode-wire 1 coming opposite the part to be welded.

The whole of the device is fed by a source of current 35 and the polarities are preferably those of the figure. A relay 36 controls the whole of the mechanism and is branched to the terminals of the welding arc.

The no-load voltage of the welding machine is usually between 45 and 60 volts. On the other hand, when welding, this voltage on the terminals of the arc is 15 to 20 volts.

When starting the machine, the general interrupter is closed; the no-load voltage on the terminals is higher at 15 volts. At this moment, the vane of the relay 36 is attracted and comes in contact with 37. This vane is constantly influenced by a spring, said spring tending to bear constantly on the opposite contact 38.

This spring acts in such a manner that in the absence of current, the movable vane is on 38; when the voltage is low at 15 volts, the movable vane is in equilibrium between 37 and 38. When the voltage is high at 15 volts, this vane comes on to 37.

When the voltage is greater than the predetermined value, for instance 15 volts, the relay 36 closes a contact 37, this sending current in the coil 27 of the plate 23. The latter, then magnetized, draws the disc 26. The shaft driving the milled rollers 3—3 rotates in such a direction that the electrode 1 moves towards the part 5 to be welded. When a short-circuit occurs, the voltage annuls itself; the relay then closes the contact 38 which sends current in the coil 28 of the plate 24. The electrode is suddenly moved backwards, this determining the starting or striking of the arc.

As soon as the space existing between the part 5 to be welded and the electrode has determined an increase of voltage of the arc and that this voltage exceeds 15 volts, the relay closes the contact 37, so that the electrode moves again towards the part to be welded and welding conditions are established, the arc preserving the required length.

In case of mistimed shortening of the arc, the relay 36 opens the contact 37 and, if necessary, sends current, through the contact 38, in the coil 28, this moving the electrode slightly backward.

Figure 3:
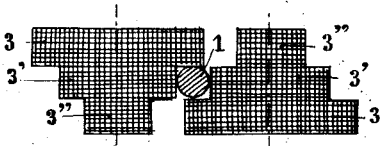
Fig. 3 is an improvement consisting in a change speed gear permitting to appreciably modify, for a given machine, the speed of feed of the electrode according to its nature or to its diameter.

Fig. 3 shows a system of rollers in which the electrode-wire is pulled between two sets of milled rollers, one of which is rigid with the driving shaft and the other is loosely mounted on an axis. These sets of rollers form three stages 3, 3' and 3", respectively, between which the electrode-wire 1 is clamped. Considering the advance of the latter is equal to the circumferential advance of the corresponding driving roller, it will be seen that it is possible to obtain three different driving speeds.

In the arrangement of Fig. 1, the regulating relay 19 might directly effect the motor, by opening for instance the armature circuit of the latter. The same result might be obtained by determining the slowing down of the motor, that is to say by inserting for instance a resistance in the armature when the arc shortens and by shunting the various resistances when the arc lengthens. These arrangements are complementary of those of Figs. 1 and 2 which permit either the intermittent stoppage of the electrode, or the intermittent backward movement or recoil of the latter.

As already stated, the starting or striking of the arc is obtained by moving the electrode-wire towards the part to be welded, this movement being followed by a backward or recoil movement as soon as the electrode comes in contact with the said part.

In the case of Fig. 2, this recoil is obtained by the reversal of the rollers driving the wire. In automatic machines actually existing, the starting or striking is obtained by reversal of the motor itself.

It has been recognized that the necessity of employing bare wire, gives rise to difficulties in starting or re-starting the arc in the course of the welding operation. The lack of rapidity in the backward movement, makes it necessary in fact to momentarily stop the relative displacement of the electrode relatively to the part to be welded, so as to effect the re-starting of the arc, on the spot, if the extinguishment of the arc takes place.

It has been observed that the arc starts much more easily if, whilst directing the electrode-wire towards the part to be welded, a rapid movement of oscillation is imparted to its free end. These oscillations, or vibrations, can be longitudinal or lateral oscillations or result from a combination of these two movements; they have for effect to do away with the sticking. In the device of Fig. 4, which connects one or the other of the arrangements of Figs. 1 and 2, the electrode-wire 1 passes through the plunger 39 of the coil 40 of an electro-magnet. A flexible transmission 41 serves as a sheath for the wire 1 and can be secured to the plunger. The electro-magnet is, preferably, connected in shunt to the terminals of the arc and its circuit is controlled by a sudden interruption contact 42. The ampere-turns of the electro-magnet are devised in order that the apparatus enters into vibration under the starting voltage of 45 to 50 volts, and ceases to vibrate for the welding voltage which is in the neighbourhood of 20 to 25 volts.

An antagonistic spring constantly opposes itself to the action of the coil and the operator, by diminishing the action of this spring, can, after the starting has been effected, prolong the vibration of the device. It will be seen that, owing to this device, the electrode-wire is no longer directed with a continuous movement towards the part 5 to be welded, but is pushed towards the latter, being subjected at the same time to rapid reciprocating displacements.

In Fig. 4, it has been supposed that the electrode-wire is driven back through the flexible transmission 41 by means of a driving device receiving a suitable speed. In Fig. 5 the actuation of the wire is effected, similar to the device of Figs. 1, 2, and 3, for instance, by means of driving rollers 3—3 secured on the plunger 39.

A modification would consist in causing the plunger to act on the electrode through the medium of a lever.

Finally, it is possible to do away with the breaking device 42 in the circuit on the coil 40.

In these conditions the plunger is subjected to the action of two forces, on the one hand, the pull of the coil and, on the other hand, the antagonistic force of the returning spring. It is therefore subjected in this case only to free oscillations depending solely on the voltage at the terminals of the coil and on the adjustment of the spring.

The plunger will be at the end of its upper stroke for voltages of the order of 20 to 25 volts, near that of the welding operation, and at the end of its lower stroke for voltages of the order of 45 to 50 volts which are commonly used for starting the arc. At the outset, the action of the starting voltage stretches an antagonistic spring and draws the metallic electrode towards the part to be welded. Immediately the contact with the part to be welded takes place, the voltage at the terminals of the arc annuls itself owing to the short circuit, and the same is true for the voltage at the terminals of the coil. The magnetic attraction exerted on the plunger ceases and the latter moves backward against an adjustable abutment drawing the electrode along with it.

The starting of the arc is thus very easily obtained and the welding can be continued if the electrode is fed at a suitable speed.

The same action takes place during welding; when the arc is accidentally cut out, an immediate re-starting occurs.

It would be possible to use for this application an electro-magnet connected in series with the circuit of the arc and through which passes the totality or a portion of the main current, or a mechanical member integral with the driving system and controlled by relays.

I claim:—

1. In a machine of the type described, a shaft, two magnetizable plates freely rotating about said shaft, a coil respectively in each inner face of these plates, means for setting either coil in communication with an auxiliary source of current, a motor, means driven by the motor for actuating the said plates in reverse directions about their common shaft, a disc arranged between the said plates and coils and keyed on the shaft, but capable of sliding along it and of imparting to it a rotary movement, driving rollers actuated by said shaft, and an electrode wire driven by said rollers.

2. In a machine of the type described, a shaft, two magnetizable plates freely rotating about said shaft, a coil respectively in each inner face of these plates, means for setting either coil in communication with an auxiliary source of current, a motor, means driven by the motor for actuating the said plates in reverse directions about their common shaft, a disc arranged between the said plates and coils and keyed on the shaft, but capable of sliding along it and of imparting to it a rotary movement, a reducing gear actuated by said shaft, driving rollers engaged by the secondary element of said gear, and an electrode wire driven by said rollers.

3. In a machine of the type described, a shaft, two magnetizable plates freely rotating about said shaft, and capable of a longitudinal movement about it, a coil respectively in each inner face of these plates, means for setting either coil in communication with an auxiliary source of current, a motor, means driven by the motor for actuating the said plates in reverse directions about their common shaft, a disc arranged between the said plates and coils and keyed on the shaft and capable of imparting to the latter a rotary movement, driving rollers actuated by said shaft, and an electrode wire driven by said rollers.

4. In a machine of the type described, a shaft, two magnetizable plates freely rotating about said shaft, a coil respectively in each inner face of these plates, a relay connected to the terminals of the welding arc the vane of which can close the circuit of an auxiliary source to either of the coils, a motor, means driven by the motor for imparting to the said plates rotations in reverse directions about their common shaft, a disc arranged between the said plates and coils and keyed on the shaft, but capable of sliding along it and of imparting to it a rotary movement, driving rollers actuated by said shaft, and an electrode wire driven by said rollers.

5. In a machine of the type described, a shaft, two magnetizable plates freely rotating about said shaft, a coil respectively in each inner face of these plates, a relay connected to the terminals of the welding arc the vane of which can close the circuit of an auxiliary source to either of the coils, a motor, means driven by the motor for imparting to the said plates rotations in reverse directions about their common shaft, a disc arranged between the coils and plates and keyed on the shaft, but capable of sliding along it and of imparting to it a rotary movement, a reducing gear actuated by said shaft, driving rollers engaged by the secondary element of said gear, and an electrode wire driven by said rollers.

6. In a machine of the type described, a shaft, two magnetizable plates freely rotating about said shaft, and capable of a longitudinal movement about it, a coil respectively in each inner face of these plates, a relay connected to the terminals of the welding arc and the vane of which can close the circuit of an auxiliary source to either of the coils, a motor, means driven by the motor for imparting to the said plates rotations in reverse directions about their common shaft, a disc arranged between the said plates and coils and keyed on the shaft, but capable of sliding along it and of imparting to it a rotary movement, driving rollers actuated by said shaft, and an electrode wire driven by said rollers.

The foregoing specification of my "automatic machine for arc welding" signed by me this 25th day of May, 1927.

ROBERT SARAZIN.